United States Patent
Hubert

(10) Patent No.: US 11,231,069 B2
(45) Date of Patent: Jan. 25, 2022

(54) WHEEL HUB BEARING PROVIDED WITH A WIRELESS POWER TRANSFER DEVICE

(71) Applicant: Aktiebolaget SKF, Gothenburg (SE)

(72) Inventor: Mathieu Hubert, Turin (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/063,071

(22) Filed: Oct. 5, 2020

(65) Prior Publication Data

US 2021/0115969 A1 Apr. 22, 2021

(30) Foreign Application Priority Data

Oct. 17, 2019 (IT) .................. 102019000019124

(51) Int. Cl.
*F16C 19/18* (2006.01)
*H02J 50/12* (2016.01)
*H02J 50/70* (2016.01)

(52) U.S. Cl.
CPC ............ *F16C 19/184* (2013.01); *H02J 50/12* (2016.02); *H02J 50/70* (2016.02); *F16C 2326/02* (2013.01)

(58) Field of Classification Search
CPC ..... F16C 19/184; F16C 2326/02; H02J 50/12; H02J 50/70; B60B 27/0068; B60B 27/0005; B60B 2310/316; B60B 27/0094; B60B 2900/541; B60C 23/0413
See application file for complete search history.

(56) References Cited

U.S. PATENT DOCUMENTS

| 5,898,388 A | 4/1999 | Hofmann et al. |
| 7,262,743 B2 * | 8/2007 | Locatelli ............ G06K 7/10178 343/841 |
| 7,618,194 B2 * | 11/2009 | Ohtsuki .................. B60B 27/00 384/480 |
| 7,878,411 B2 * | 2/2011 | Muranaka ............. F16C 41/007 235/492 |
| 9,584,190 B2 * | 2/2017 | Ji ........................... B60W 10/04 |
| 2002/0033638 A1 * | 3/2002 | Okada ................... F16C 41/008 303/20 |
| 2002/0130655 A1 * | 9/2002 | Okada ................. F16C 33/7896 324/174 |

(Continued)

FOREIGN PATENT DOCUMENTS

| EP | 2159578 | 3/2010 |
| JP | 2017106609 | 6/2017 |

(Continued)

OTHER PUBLICATIONS

International Search Report for corresponding Italian Patent Application No. 102019000019124 dated Jun. 24, 2020.

*Primary Examiner* — Jared Fureman
*Assistant Examiner* — Michael J Warmflash
(74) *Attorney, Agent, or Firm* — Reed Smith LLP

(57) ABSTRACT

A wheel hub bearing for motor vehicles, comprising a hub and a bearing unit in turn comprising a radially outer ring, at least one radially inner ring, at least one crown of rolling bodies between the radially outer ring and the radially inner ring, whereas the hub has a radial stiffening. The radial stiffening of the hub has a misalignment (d) respect to a seat, i.e. a distance between a centerline axis (Y) of the seat of the radially inner ring on the hub and a centerline (Z) of the radial stiffening less than or equal to 25% of a length (l) of the seat.

14 Claims, 2 Drawing Sheets

(56) References Cited

U.S. PATENT DOCUMENTS

| | | | | |
|---|---|---|---|---|
| 2005/0046559 A1* | 3/2005 | Kulha | ................... | B60C 23/043 |
| | | | | 340/445 |
| 2005/0226545 A1 | 10/2005 | Ohtsuki | | |
| 2005/0258950 A1* | 11/2005 | Sahashi | ............... | B60C 23/0433 |
| | | | | 340/444 |
| 2017/0158012 A1* | 6/2017 | Hubert | ................. | F16C 19/163 |
| 2018/0006493 A1 | 4/2018 | Ludois et al. | | |
| 2019/0126677 A1* | 5/2019 | Hubert | ................... | B60B 27/02 |

FOREIGN PATENT DOCUMENTS

| | | | | |
|---|---|---|---|---|
| JP | 2018001769 | | 1/2018 | |
| KR | 20150109714 A | * | 10/2015 | |
| KR | 102015109714 | | 10/2015 | |
| KR | 101612477 | | 4/2016 | |
| WO | 20080129787 | | 10/2008 | |
| WO | WO-2008129787 A1 | * | 10/2008 | ........... B60C 23/043 |
| WO | 2018038572 | | 3/2018 | |

\* cited by examiner

WHEEL HUB BEARING PROVIDED WITH A WIRELESS POWER TRANSFER DEVICE

CROSS REFERENCE TO RELATED APPLICATION

This application is based on and claims priority to Italian Application No. 102019000019124, filed Oct. 17, 2019, under 35 U.S.C. § 119 the entire contents of which are incorporated herein by reference.

FIELD

The present invention relates to a wheel hub bearing provided with a wireless power transfer device.

BACKGROUND

Wheel hub bearing provided with a bearing unit for rotatably supporting a vehicle wheel on a suspension are known and commonly used. The bearing unit typically includes a pair of rolling bearings.

The current state of the art also comprises so called "smart" wheels or tires, provided with sensors, for example, tire pressure monitoring system (TPMS). Such sensors need to be supplied with a reliable source of energy during the life of the vehicle.

BRIEF DESCRIPTION OF THE DRAWINGS

The invention will now be described with reference to the accompanying drawings, which illustrate some non-limiting embodiments thereof, in which.

DETAILED DESCRIPTION

Figure 1:
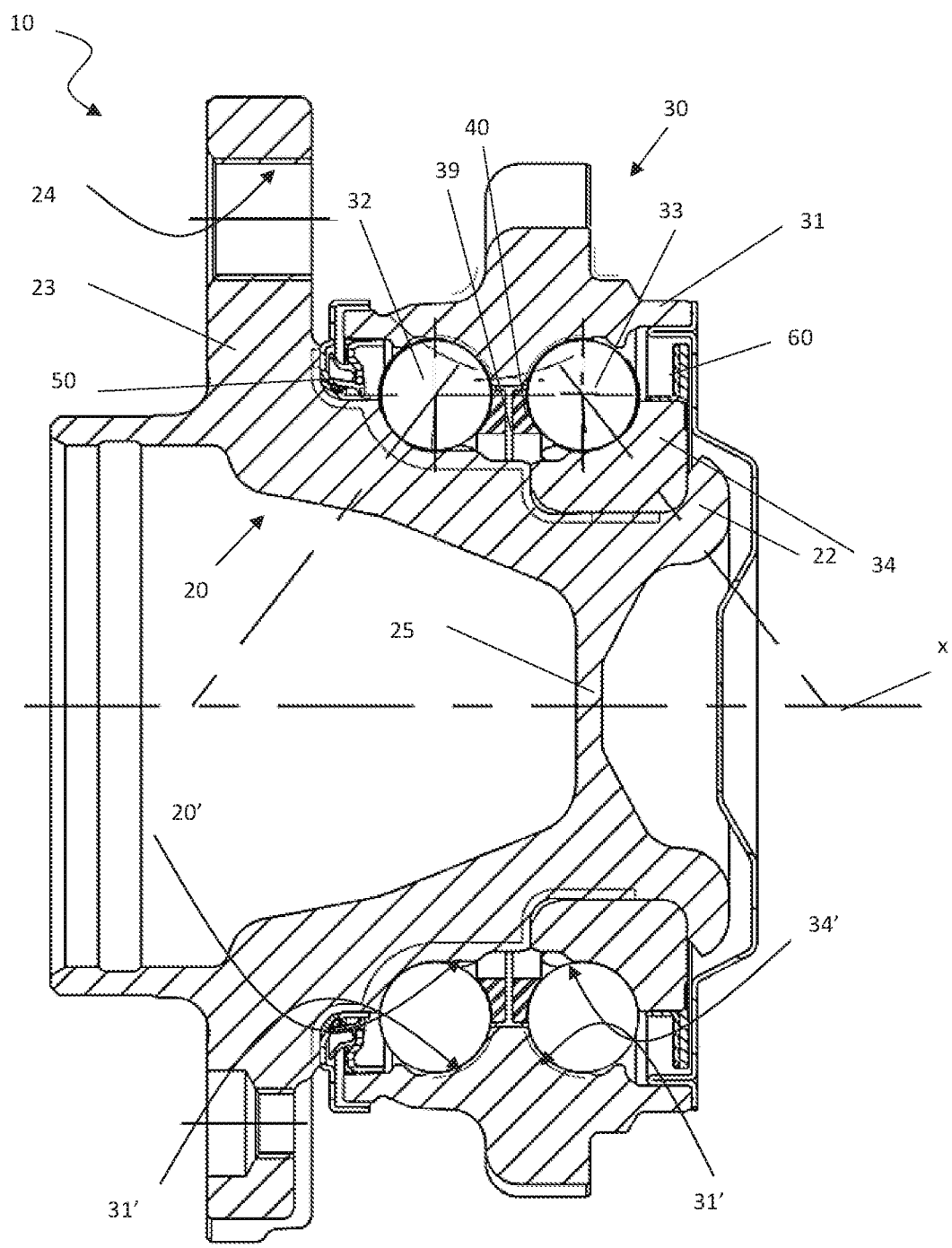
FIG. 1 is a cross-section of a wheel hub bearing, according to an embodiment of the present invention.

Potential sensors assembled on the rotating elements of a wheel that would require reliable electrical connection are, by way of examples, the followings:
 tire pressure monitoring system,
 tire wear monitoring system,
 tire load sensor,
 vibration monitoring,
 automatic inflation system,
 load sensing system on the rim.

A major limitation for smart systems accommodated into vehicle wheels is the battery relied upon by these devices. No electric connection is possible between the rotating wheel and the power network on the chassis, thus car manufacturers and suppliers use battery powered systems such as TPMS. In other words, the solution for sensor such as TPMS is to use a battery and low consumption electronic circuits and processors. Battery life limits the amount of sensor data that can be collected and/or data transmitted. A result is that the real time capabilities of sensors are drastically reduced in order to preserve a battery life of at most three years.

Several tire manufacturers and condition monitoring providers are advertising more and more sensors at the tire level without reliable power source solutions.

By providing a reliable wireless power transfer from the vehicle network, this limitation is removed allowing new sensor technology for tire monitoring.

The wheel hub bearing is links the stationary chassis, wherein a battery can be accommodated, to the tire and its sensors dispose on a rotating wheel. Therefore, a wheel hub bearing is the perfect location to embed a wireless energy transfer device capable of providing a reliable power source to smart wheels and/or tires. A first part of an electronic can be attached to a non-rotating part of the wheel hub bearing (e.g., outer ring, seal or knuckle) and a second part of an electronic can be attached to a rotating part of the bearing (e.g., small inner ring, flanged inner ring, seal flinger or magnetic encoder).

An example of a wireless energy transfer device is disclosed in KR102015109714A for application to a non-driven wheel end with axial flat coils. However, the solution proposed in this document has several drawbacks, which cannot be addressed. First, the wheel hub bearing is exposed to the risk of high friction and high deflection of the seal, due to the large running diameter of the layout disclosed therein. Second, and moreover, the addition of the wireless energy transfer device requires changing the location of the seals and their design rules. Third, no cabling solution is available for this solution that is not intrusive of the sealed volume of the bearing.

Accordingly, there is a substantial unmet need for a wheel hub bearing provided with a wireless energy transfer device that does not suffer of the above mentioned drawbacks. Embodiments in accordance with this disclosure relate to an improved wireless power transfer device assembled on the wheel hub bearing and provided with a pair of rolling bearings for rotatably supporting a vehicle wheel on a suspension.

Such applications include both the case where the outer ring of the bearings is rotatable while the inner rings of the bearing are fixed, and the opposite case in which the inner rings rotate and the outer ring is fixed. Various embodiments are also suitable for any type of rolling bodies (balls, rollers, tapered rollers, etc.). By way of non-limiting example, embodiments will now be described with reference to a wheel hub bearing for motor vehicles provided with a bearing unit.

With reference to FIG. 1, a wheel hub bearing according to a preferred embodiment of the invention is indicated as a whole with 10. The figure shows a detail of the exemplifying configuration.

A wheel hub bearing 10 has a central rotation axis X and comprises a hub 20 preferably, but not necessarily, rotatable, and a bearing unit 30, which in turn comprises:
 a radially outer ring 31, preferably, but not necessarily, stationary,
 a radially inner ring or flanged inner ring 20 defined by the hub 20,
 a further radially internal ring 34 rotatable mounted on and integral with the hub 20;
 two rows of rolling bodies 32, 33, in this example balls, interposed between the radially outer ring 31 and the radially inner rings 20 and 34; and
 two cages 39 and 40 for keeping in position the rolling bodies of the rolling bodies rows 32, 33.

Throughout the present description and the claims, the terms and expressions indicating positions and orientations such as "radial" and "axial" refer to the central rotation axis X of the bearing unit 30. Expressions such as "axially external" and "axially internal" are, instead, referred to the mounted condition of the wheel hub bearing, and in this case, preferably, they refer to a wheel side and, respectively, to a side opposite the wheel side.

The radially outer ring 31 is provided with two respective radially outer raceways 31', while the radially inner rings 20, 34 are provided with respective radially inner raceways 20', 34' to allow the rotation of the rolling bodies row 32, axially outer, interposed between the radially outer ring 31 and the hub 20, and the rolling bodies row 33, axially inner, between the radially outer ring 31 and the radially inner ring 34. For simplicity of graphical representation the references 32, 33 will be attributed both to the individual balls and to the ball rows. Again for simplicity, the term "ball" can be used in an exemplary manner in the present description and in the accompanying drawings in place of the more generic term "rolling body" (and the same numerical references will also be used).

Hub 20 defines in its axially inner end a rolled edge 22, which is configured for axially preloading inner ring 34. Hub 20 also has an axially outer flange portion 23. Flange portion has a plurality of axial fixing holes 24. These holes are seats for the same number of fixing means (for example stud bolts, not shown in the figure) which connect an element of the motor vehicle wheel, for example the non-driven wheel or the brake disc (also of the known type and not shown in the figure), to hub 20.

Wheel hub bearing 10 is also provided with sealing means 50 for sealing such a bearing unit from the external environment. Moreover, a wheel hub bearing may also be provided with devices for detecting a parameter of a motor vehicle, for example the speed of rotation of rotating ring 34 of bearing unit 30. In an example encoder 60 is provided, as shown in FIG. 1.

Figure 2:
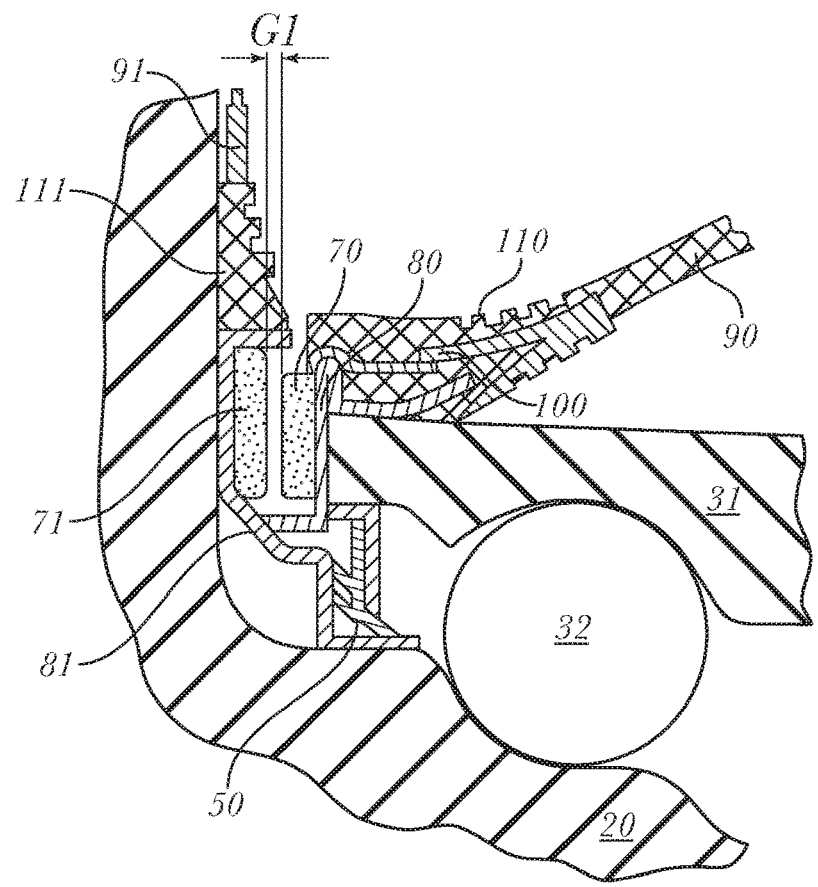
FIG. 2 is an enlarged detail of the flanged hub and the bearing unit of FIG. 1, schematically showing the wireless power transfer device, according to the invention.

With reference to FIG. 2, a wireless power transfer is provided. An emitting electronic is assembled on a radially outer ring 31, while a receiving electronic is disposed on a flanged inner ring or hub 20. In embodiments a radially outer ring, e.g, 31, a flanged inner ring or hub 20, and an emitting coil 70 and a receiving coil 71 are configured such that emitting coil 70 and receiving coil 71 are axially spaced by a first airgap G1 smaller than 1.5 mm. In some embodiments airgap G1 is between 0.1 and 1.5 mm. In some embodiments airgap G1 is less than 0.1 mm but not nonexistent.

In an inductive solution, an emitting electronic comprises an emitting coil 70, made of copper wires and attached to a ferromagnetic shield 80. Shield 80 must preferably have a high magnetic permeability and a low electric conductivity in order to minimize magnetic loss. To conduct a strong magnetic field, shield must be made of metallic material and especially ferromagnetic material. Aluminium or plastic material must be avoided. However, composite materials (plastic/ferrite) are viable and within the scope of this disclosure.

In some embodiments an emitting coil is protected from the environment by an impregnation of a protective and electrically insulated resin or by overmolding with plastic or rubber.

Several solutions can be used to connect the emitting coil 70 to the power cable 90. For example, a coil can be directly soldered to the cable wire. As an alternative, a coil can be crimped to a cable wire using a deformable metallic tube. According to a further preferred solution, shown in FIG. 2, a emitting coil 70 can be soldered or crimped to a conductive lead frame 100. Lead frame 100 may be crimped or soldered to the cable wire of the power cable 90.

In some embodiments, connections between emitting coil 70 to power cable 90 can be overmolded with shield 80 by an overmolding polymer 110 (for instance, a thermoplastic polymer or an elastomeric polymer) in order to create a unique and robust unit. In some embodiments, a coil can also be overmolded, however the thickness of plastic at the surface of the coil has to be minimal to optimize an airgap between the two coils.

An emitting electronic is preferably press-fitted to a radially outer ring, e.g., 31 in order to interlock it to a non-rotating element of a bearing unit, e.g., 30. Assembly occurs after press fitting on the outer ring of a seal 50. An emitting electronic can also be assembled to a radially outer ring 31 in any other suitable way.

An emitting coil is preferably connected to an oscillator electric circuit (known and therefore not shown in the figure) that converts DC voltage from a battery (usually between 8V to 15V for passenger vehicle) to AC voltage to create an inductive effect. This conversation can be also done in any suitable way. Oscillator electric circuit, or more in general, an electronic can be embedded between emitting coil 70 and power cable 90 in the overmolded volume. In alternative, this electronic can be accommodated in any other part of the electric circuit outside the bearing and wheel volume.

The receiving electronic has the same design, and therefore comprises a receiving coil 71 and a shield 81, holding the coil. Shield 81 used to attach a coil is also used as seal contact surface flinger. As with an emitting electronic also for a receiving electronic; receiving coil 71 can be glued or overmolded and a cable connection to flat cable 91 is done the same way as for emitting coil 70. For example, receiving coil 71 can be soldered or crimped to a conductive lead frame (not shown in FIG. 2). Lead frame 101 is crimped or soldered to the cable wire of flat cable 91.

The connection between a receiving coil 71 and a flat cable 91 can be overmolded with the shield 81 by an overmolding polymer 111 (for instance, a thermoplastic polymer or an elastomeric polymer) in order to create a unique and robust unit.

This receiving electronic is press-fitted on a hub, e.g., 20 before the assembly of the bearing. In this concept, coils are outside the sealing area in order to avoid any additional holes in a bearing or sealing solution in order to maintain optimal bearing robustness against contamination. A coil may be protected by a resin/polymer (non-conductive) in order to sustain the environment. A shield is designed in order to maintain the same seal interface as in the state of the art for seals.

A receiving coil 71 gets an AC signal that can be converted to a DC voltage using a rectifier circuit. Such conversion can be realized by electronic devices that may be embedded in a wheel sensor or tire sensors.

It is possible to limit as much as possible a coil diameter, since both an emitting and a receiving coil are located one in front of the other in a position that is radially internal with respect to the flange portion 23 of the hub 20. Consequently, an equivalent deflection during cornering will be lower than in cases where coils have a higher diameter.

Particular attention must be provided in designing shields 80, 81. To get a strong magnetic circuit, shield shape is really important.

Figure 3:
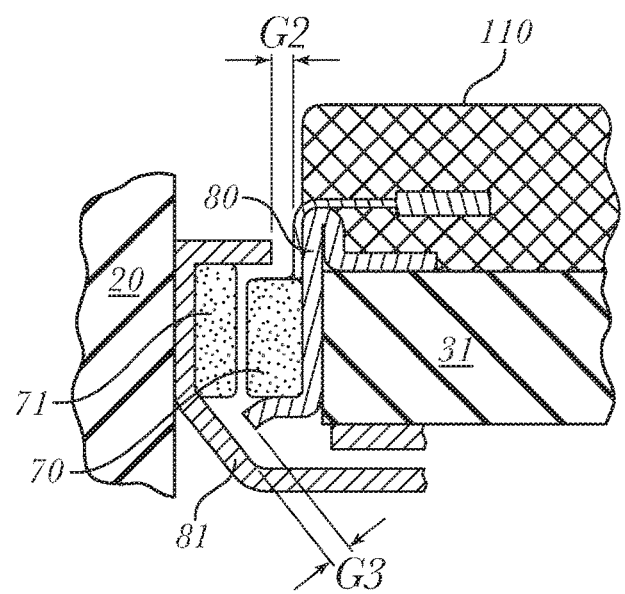
FIG. 3 is a further more enlarged detail schematically showing the magnetic field of the wireless power transfer device of FIG. 2.

In embodiments, assembly and the shape of shields are done with three purposes:
  to minimize an airgap between coils 70, 71. Minimum airgap is defined by the maximum deflection of the bearing during cornering and/or impact events, to create and maintain a good magnetic loop around the two coils. The shapes of the two shields that are supporting the coils are designed in order to have minimum airgap between ferromagnetic element and create a magnetic circuit. As shown in FIG. 3, a second airgap G2 and a third airgap G3 between the shields 80, 81 have to be smaller than 1 mm in order to create a strong magnetic circuit, to create a labyrinth in order to reduce contamination in the coil area.

The small length of the two airgap G2 and G3 has the main purpose of concentrating the magnetic field into a loop around both coils. On the other hand, such small length has also the advantages of avoiding or at least reducing as much as possible the contamination inside the bearing unit.

The minimum value of the airgap G2, G3 is determined by the tolerance of the components and by the deflection of the elements during cornering. To improve such a minimum value, on both hub 20 and radially outer ring 31, the contact surfaces of the shield can be machined to reduce the tolerance. A further improvement can be obtained by shaping the shields so that they are rigid enough to reduce oscillation during working condition.

In addition, one of the circuit can optionally have a resonant circuit in order to optimize the energy transmission for larger gaps between the rotating elements.

In addition, the emitting and receiving circuit could have digital control and order to transmit digital information in addition of the power as it is done for smartphone charging station.

This solution provide a reliable energy source and with high power capability (compared with standard battery systems). Car manufacturers or suppliers can design complex sensing system with advanced processing electronic on the rotating part without compromise respect to device service life.

The system can be inside the bearing providing a seamless integration for the customer. In addition, the bearing is already using a cable system for the ABS sensor, the same cabling route could be used for the wheel sensors.

A wheel hub bearing for motor vehicles is provided with a wireless power transfer device, producing a strong magnetic field and not affecting the standard layout of the known wheel hub bearing. The wheel hub bearing is equipped with a bearing unit comprising an outer ring, a pair of inner rings, of which the inner axially outer ring consists of the same hub while the inner axially inner ring is a separate element mounted on the hub, and a plurality of rolling bodies, for example balls. The flanged, rotatable hub is connected to a non-motive wheel of a motor vehicle.

Technology for contactless power transmission is provided. Such technology is already known and applied, for example, to electric toothbrush or wireless smartphone charging station. The technology can be inductive, inductive with or without a resonant circuit or capacitive. One part of the electronic is attached to the non-rotating part of the wheel hub bearing (outer ring, seal or Knuckle) and the second part of the electronic is attached to the rotating part of the bearing (small inner ring, flange inner ring, seal flinger or magnetic encoder). The exemplary embodiments herein are explained using an inductive solution, but upon reading this disclosure one will appreciate that inductive with or without a resonant circuit or capacitive solutions are equally within the scope of this disclosure.

Cost-effective and efficient wireless power transfer devices have a very small distance between the emitting and the receiving power systems. For wheel application, the wheel hub bearing is the ideal location to ensure a small airgap thanks to the stiffness of the product and its accurate mechanical elements.

According some embodiments, both the emitting electronic and the receiving electronic comprise a copper coil attached to a ferromagnetic shield. The flinger must preferably have a high magnetic permeability and a low electric conductivity in order to minimize magnetic loss. The airgap between the ferromagnetic shields should be minimized and has to be smaller than 1.5 mm.

In addition, the cabling solution allows not to create any additional holes in steel shield or bearing steel, thus avoiding any risk of contamination.

In addition, layout of the seals of the bearing unit has to be the same as for standard bearing unit, so that the seal design rules can be maintained.

Therefore, a wheel hub bearing is provided with a wireless power transfer device having the characteristics set forth in the independent claim, annexed to the present description.

Further embodiments preferred and/or particularly advantageous, are described herein according to the characteristics set forth in the attached dependent claims.

In addition to the embodiment described above, it is to be understood that numerous further variants exist. It must also be understood that such embodiments are only exemplary and limit neither the scope of this disclosure, nor its applications, nor its possible configurations. On the contrary, although the above description makes it possible for the skilled technician to implement embodiments present invention, it must be understood that many variations of the described components are conceivable, without thereby departing from the scope of the attached claims, which are interpreted literally and/or according to their legal equivalents.

The invention claimed is:

1. A wheel hub bearing for motor vehicles, comprising:
a radially outer ring,
at least one radially inner ring,
at least one row of rolling bodies between the radially outer ring and the radially inner ring; and
a wireless power transfer device comprising:
an emitting coil and a first shield assembled on the radially outer ring,
a receiving coil and a second shield assembled on the at least one radially inner ring, wherein the emitting coil and the receiving coil are axially spaced defining a first airgap having a length of 0.1-1.5 mm, and
the first shield and the second shield are axially spaced defining a second airgap having a length smaller than 1.0 mm.

2. The wheel hub bearing of claim 1, wherein a connection between the emitting coil and a power cable is overmolded with the first shield, further comprising an electronic device embedded in the overmolding between the power cable and the emitting coil.

3. The wheel hub bearing of claim 1, wherein a connection between the receiving coil and a flat cable is overmolded with the second shield.

4. The wheel hub bearing of claim 2, wherein a connection between the receiving coil and a flat cable is overmolded with the second shield.

5. The wheel hub bearing of claim 2, wherein the overmolding is made of a thermoplastic polymer or of an elastomeric polymer.

6. The wheel hub bearing of claim 4, wherein the overmolding is made of a thermoplastic polymer or of an elastomeric polymer.

7. The wheel hub bearing of claim 1, wherein the emitting coil or the receiving coil is overmolded.

8. The wheel hub bearing of claim 1, wherein an emitting electronic that includes the emitting coil is press-fitted to the radially outer ring.

9. The wheel hub bearing of claim 1, wherein a receiving electronic that includes the receiving coil is press-fitted on at least one of the at least one radially inner ring.

10. The wheel hub bearing of claim 8, wherein the emitting electronic is an oscillator electric circuit configured as a DC/AC converter coupled to the emitting coil.

11. The wheel hub bearing of claim 9, wherein the receiving electronic is a rectifier electric circuit configured as an AC/DC converter connected to the receiving coil.

12. The wheel hub bearing of claim 1, wherein the emitting electronic or the receiving electronic is respectively provided with a resonant circuit in order for optimizing energy transmission between the emitting coil and the receiving coil.

13. A wireless power transfer device for a rotating bearing unit, comprising:
 an emitting coil disposed upon a stationary component;
 a receiving coil disposed upon a rotating component;
 a first shield overmolded upon the emitting coil; and
 a second shield overmolded upon the receiving coil,
 wherein the stationary component and the rotating component are relatively configured such that the emitting coil and the receiving coil define a first airgap that is less than 1.5 mm in length and the emitting coil, the receiving coil, the first shield, and the second shield cooperatively define a labyrinth, wherein the first shield and the second shield define at least one second airgap that is less than 1.0 mm in length.

14. The wireless power transfer device for the rotating bearing unit of claim 13, wherein the stationary component is a radially outer ring of a wheel hub bearing unit and the rotating component is at least one radially inner ring.

* * * * *